US012719265B2

(12) United States Patent
Karlsson et al.

(10) Patent No.: US 12,719,265 B2
(45) Date of Patent: Aug. 25, 2026

(54) DEVICE AND METHOD FOR PROTECTING A HARVESTING CIRCUIT AND/OR ENABLING ENERGY HARVESTING

(71) Applicant: Hitachi Energy Ltd, Zürich (CH)

(72) Inventors: Pär Karlsson, Ludvika (SE); Johan Emil Kristiansson, Stockholm (SE); Anders Kvist, Sundbyberg (SE); Martin Sikström, Sundbyberg (SE)

(73) Assignee: Hitachi Energy Ltd, Zürich (CH)

( * ) Notice: Subject to any disclaimer, the term of this patent is extended or adjusted under 35 U.S.C. 154(b) by 116 days.

(21) Appl. No.: 18/848,284

(22) PCT Filed: Feb. 28, 2023

(86) PCT No.: PCT/EP2023/055039
§ 371 (c)(1),
(2) Date: Sep. 18, 2024

(87) PCT Pub. No.: WO2023/186434
PCT Pub. Date: Oct. 5, 2023

(65) Prior Publication Data

US 2025/0210978 A1 Jun. 26, 2025

(30) Foreign Application Priority Data

Mar. 31, 2022 (EP) .................................... 22165998

(51) Int. Cl.
*H02H 9/04* (2006.01)
*H02H 1/06* (2006.01)

(52) U.S. Cl.
CPC .............. *H02H 9/042* (2013.01); *H02H 1/06* (2013.01)

(58) Field of Classification Search
CPC ................................ H02H 9/042; H02H 1/06
(Continued)

(56) References Cited

U.S. PATENT DOCUMENTS 4,152,743 A * 5/1979 Comstock .............. H02H 9/042 361/111
4,271,446 A * 6/1981 Comstock .............. H02H 3/046 361/111
(Continued)

FOREIGN PATENT DOCUMENTS

CN 207007960 U 2/2018
EP 3503331 A1 6/2019
(Continued)

OTHER PUBLICATIONS

Extended European Search Report dated Sep. 16, 2022, for European Patent Application No. 22165998.0, 7 pages.
(Continued)

*Primary Examiner* — Dharti H Patel
(74) *Attorney, Agent, or Firm* — Sage Patent Group

(57) ABSTRACT

A device including a diversion circuit and a harvesting circuit, wherein the diversion circuit includes at least two parallel connected protection branches between a surge arrester and ground. The at least two protection branches include at least one TVS device and at least one impedance connected in series with the at least one TVS device. The diversion circuit is configured to divert leakage current through the harvesting circuit and bypass the harvesting circuit and lead surge current via the at least one parallel connected protection branch to ground, during a surge event, to protect the measurement circuit.

14 Claims, 4 Drawing Sheets

(58) Field of Classification Search
USPC .......................................................... 361/91.1
See application file for complete search history.

(56) References Cited

U.S. PATENT DOCUMENTS 4,652,963 A * 3/1987 Fahlen ..................... H02H 7/16 361/127
4,677,518 A * 6/1987 Hershfield ............... H02H 9/06 361/120
4,698,721 A * 10/1987 Warren .................. H02H 5/005 361/111
5,949,158 A * 9/1999 Schulz .................. H02M 5/257 307/127
6,226,166 B1 * 5/2001 Gumley ................... H02H 9/06 361/111
7,697,253 B1 * 4/2010 Maraval .................... B66C 1/08 361/144
7,933,108 B2 * 4/2011 Tallam ..................... H02H 9/06 361/120
8,847,656 B1 * 9/2014 A ......................... H03K 17/122 327/318
11,824,350 B1 * 11/2023 Khalilinia ................ H02H 9/06
2005/0180080 A1 * 8/2005 Harris .................... H02H 9/042 361/111
2009/0267411 A1 * 10/2009 Wang ........................ H02J 7/14 361/18
2011/0299203 A1 * 12/2011 Ruess .................... H02H 9/042 361/56
2017/0047733 A1 * 2/2017 Buchanan .............. H02H 9/041
2017/0108550 A1 4/2017 Raschke
2018/0175616 A1 * 6/2018 Schneider ................. H01T 1/14
2020/0036185 A1 * 1/2020 Tsovilis ................... H02H 9/06
2023/0089717 A1 * 3/2023 Johansson .............. H02H 9/041 324/552
2023/0318288 A1 * 10/2023 Dai .......................... H02H 9/06 361/205
2023/0396053 A1 * 12/2023 Tsovilis ................... H02H 9/06
2025/0210977 A1 * 6/2025 Kristiansson .......... G01R 31/52
2025/0210978 A1 * 6/2025 Karlsson .................. H02H 1/06

FOREIGN PATENT DOCUMENTS

EP 3876374 B1 * 1/2026 ......... G01R 31/1254
SI 25695 A 2/2020

OTHER PUBLICATIONS

International Search Report and Written Opinion of the International Searching Authority, PCT/EP2023/055039, mailed Jun. 1, 2023, 13 pages.
Written Opinion of the International Preliminary Examining Authority, PCT/EP2023/055039, mailed Mar. 5, 2024, 6 pages.
International Preliminary Report on Patentability of the International Preliminary Examining Authority, PCT/EP2023/055039, mailed Jun. 18, 2024, 15 pages.

* cited by examiner

DEVICE AND METHOD FOR PROTECTING A HARVESTING CIRCUIT AND/OR ENABLING ENERGY HARVESTING

CROSS REFERENCE TO RELATED APPLICATIONS

This application is a 35 U.S.C. § 371 national stage application of PCT International Application No. PCT/EP2023/055039 filed on Feb. 28, 2023, which in turn claims foreign priority to European Patent Application No. 22165998.0, filed on Mar. 31, 2022, the disclosures and content of which are incorporated by reference herein in their entirety.

TECHNICAL FIELD

The present disclosure relates to the field of surge arrester monitoring devices. In particular the present disclosure relates to enabling energy harvesting and/or protection of a harvesting circuit.

BACKGROUND

Overvoltage events caused by lightning strikes, switching operations or temporary surges, can result in power outages in power stations, substations, and electric power transmission and distribution lines. Surge arresters, which are configured to have a high impedance at normal operating voltage and a low impedance during a surge event, are usually installed between phase and ground to provide protection from excessive overvoltage caused by such overvoltage events. When the voltage across the surge arrester terminals exceeds a predetermined threshold voltage, the surge arrester conducts the current caused by the overvoltage to the ground.

The condition of a surge arrester can be monitored by measuring the leakage current through the ground conductor at the grounded side of a surge arrester. The total leakage current of a surge arrester is composed of a capacitive component and a resistive component, whereby the capacitive component is much larger than the resistive component. An increase in the resistive current, and consequently the total leakage current, indicates that the condition of the surge arrester has degraded.

A number of measurement methods have been utilized to reveal signs of deterioration and provide clues to impending surge arrester failure. Many of these measurements utilize sensitive leakage current measurement circuitry that can measure small changes in the total leakage current. When making such measurements, the leakage current at normal operating voltage is measured, but the sensitive measurement circuitry must at the same time be protected from overcurrent to which a surge arrester may be exposed during surge events.

For a surge arrester monitoring system a number of parameters are useful to measure, including resistive leakage current, surge count, impulse characteristics, etc. As monitoring of surge arresters becomes more advanced and customer expectations increases so does the need for transmitting and processing this information in an efficient way. In order to do this, electronic circuits need to be powered and data needs to be regularly sent over very long distances. At the same time, the location of surge arresters necessitates the need for the equipment, e.g., surge arresters and monitoring devices, maintenance period to match each other. Today, surge arresters usually are maintenance free and therefore the monitoring devices also needs to be maintenance free, which means no replacement of batteries, cleaning etc. Hence, the problem lies in autonomously powering devices that require a substantial amount of energy to perform the required operations, such as measure, process, display/indicate and transmit data/signal.

Previously electronic devices have been powered using a variety of methods, including solar cells, electrical field sensors and battery/capacitor solutions. These technologies provide a number of drawbacks that includes e.g., suitability of installation locations and maintenance periods. In addition, the traditional ways of powering devices may not be enough for modern monitoring equipment that has higher power demands.

A number of measurement methods have been utilized to reveal signs of deterioration and provide clues to impending surge arrester failure. Many of these measurements utilize sensitive leakage current measurement circuitry that can measure small changes in the total leakage current. When making such measurements, it is essential to protect the sensitive measurement circuitry against overcurrent to which a surge arrester may be exposed during surge events.

One known method to measure the leakage current is a standard pass-through solution in which a solid aluminium conductor carrying a primary current is passed through a toroidal core conversion circuit to generate a secondary current that is picked up by a leakage current measurement circuit. Conventional diodes are then used to rectify the secondary current signal. A problem with this approach is that very small secondary currents are generated in the toroidal core's secondary winding limiting this approach capability in terms of harvesting enough energy for a measurement, processing, display and transmit circuitry.

Another known method is to use a circuit comprising a metal oxide (MO) block to divert the leakage current to a measurement circuit. A drawback of this method is that the MO block must be selected to match the characteristics of the surge arrester which leakage current is being measured, and which also contains MO blocks, and the process of assembling such a measurement circuit is complex.

It is also known to use a spark gap to divert the leakage current to a measurement circuit. Drawbacks with this method are the difficulties involved in providing a specific gap distance between electrodes and ensuring a safe failure mode. A very rigid housing is needed so that the spark gap distance is always accurately controlled, and there may be problems concerning the aging of the spark gap and fluctuations of the spark gap characteristics due to climate and environmental conditions, such as humidity, temperature or altitude.

The present disclosure presents an improved viable solution of a device that handles the issues described above by enable energy harvesting and/or provide protection for electronic circuits that enable surge arrester monitoring devices to operate without interruption during all system events of a transmission network.

SUMMARY

It is an object of embodiments herein to provide an improved device that handles protection of a measurement circuit and/or enables energy harvesting, in an efficient manner, or at least to achieve an alternative to known solutions within the technical field.

According to an aspect the object is achieved by providing a device comprising a diversion circuit and a harvesting circuit. The diversion circuit comprises at least two parallel connected protection branches connected between a surge arrester and ground. Each of the at least two protection branches comprise at least one transient voltage suppression (TVS) device and at least one impedance connected in series with the at least one TVS device. The diversion circuit is configured to divert leakage current, e.g., at least partially, from the surge arrester through the harvesting circuit and bypass the harvesting circuit and lead surge current via the at least one protection branch to ground during a surge event, to protect one or more circuitries including the harvesting circuit. The device may be configured to lead the leakage current to a measurement circuit.

According to another aspect the above-mentioned object is also achieved by providing a method for protecting a harvesting circuit and/or enabling energy harvesting. The method comprises the step of providing a device comprising a diversion circuit and the harvesting circuit. The diversion circuit comprises at least two parallel connected protection branches connected between a surge arrester and ground. The at least two protection branches comprise at least one TVS device and at least one impedance connected in series with the at least one TVS device. The diversion circuit diverts leakage current, e.g., at least partially, from the surge arrester through the harvesting circuit and bypasses the harvesting circuit and leads surge current via the at least one parallel connected protection branch to ground, during a surge event. The device may lead the leakage current to a measurement circuit. The at least one parallel connected protection branch protects one or more circuitries, including the harvesting circuit.

Embodiments herein are based on the realisation that by bypassing the harvesting circuit and leading surge current via the at least one parallel connected protection branch to ground during a surge event, energy harvesting is enabled which allows the leakage current to power one or more monitoring devices and the harvesting circuit can be protected against overcurrent and in an efficient manner.

BRIEF DESCRIPTION OF THE FIGURES

Further technical features of aspects of the present disclosure will become apparent through the following description of one or several example embodiments given with reference to the appended figures, where.

It should be noted that the drawings have not necessarily been drawn to scale and that the dimensions of certain elements may have been exaggerated for the sake of clarity.

DETAILED DESCRIPTION

Embodiments herein relate to a solid-state current diversion circuit (DC) for surge arrester monitoring devices. The embodiments herein enable diversion of a substantial amount of leakage current from a surge arrester into a circuit that may harvest and store the energy as well as power other parts of the surge arrester monitoring device. Previously, this may be solved by solar cells, electrical field and battery solutions and these solutions adds cost and complexity to the products as well as limitations on suitable installation locations, e.g., indoors, in geographical regions with limited daylight, etc. At the same time the DC will protect the circuitry against overcurrent during system events of a transmission network, e.g., during normal operation, surge events and earth fault events.

Figure 1:
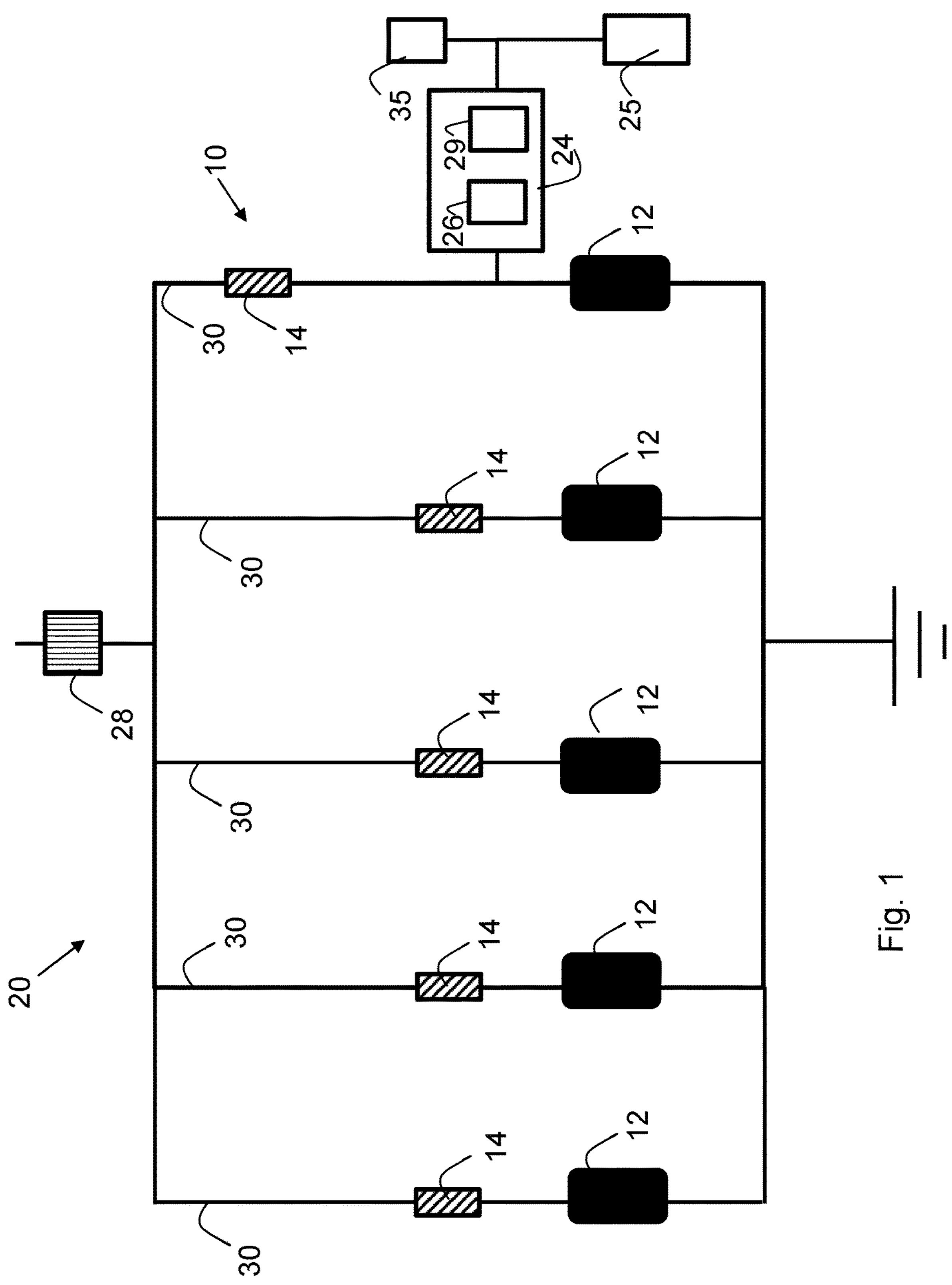
FIG. 1 shows a device according to embodiments herein.

A device 20 according to embodiments herein is illustrated in FIG. 1. The device 20 comprises a diversion circuit 10 and a harvesting circuit 24. The device may also comprise a measurement circuit 25 to measure at least one of the values of leakage current, temperature, number (count) of surges and waveform of the surge current. The measurement circuit 25 may also be a central unit that collects measured data from other devices and not necessarily perform any direct measurement. The diversion circuit 10 comprises at least two protection branches 30 connected between a surge arrester 28 and ground. FIG. 1 depicts five protection branches 30, and various circuitries, i.e., the harvesting circuit 24, measurement circuit 25 and monitoring circuit 35, which are shown connected with a solid line or a dotted line to each other. For simplicity the solid line/dotted line may represent both power and signal/data connections. These various circuitries will be explained in detail in the subsequent sections and are generally connected in parallel to the at least one TVS device 12 comprised in the at least one of the protection branch 30. The number of protection branch 30 may be different from that illustrated in FIG. 1 and at the minimum one protection branch is required to protect the various circuitries including the harvesting circuit 24. More than one number of protection branch 30 may be connected in parallel combinations to effectively handle the surge current through the device 20 when the surge arrester 28 conducts during a surge event. The at least one protection branch 30 also comprises at least one impedance 14, connected in series with the at least one TVS device 12.] Each of the at least one protection branch 30 comprises at least one TVS device 12 which may preferably be connected at the ground end, e.g., have one of the terminals of the TVS device 12 connected to the ground and the other terminal connected to the impedance. FIG. 1. shows symbolic connections between the various circuits.

The at least one TVS device 12 may be a TVS diode and the at least one impedance 14 may be a resistor. The TVS device 12 may operate by shunting excess current when the induced voltage exceeds the avalanche breakdown potential. The TVS device 12 may suppresses all overvoltage above its breakdown voltage. It automatically goes back to its normal state when the overvoltage has passed.

In the normal state, the TVS device 12 offers very high impedance compared with the total impedance of the one or more circuitries for harvesting, measurement and communication/indication of the measured leakage current and/or surge count. Thus, the diversion circuit 10 is able to divert, e.g., almost completely divert, the leakage current from the surge arrester to the one or more circuitries connected in parallel to the TVS device 12. I.e., the leakage current through the TVS device 12 may be considered as negligible. During a surge activity the TVS device 12 is designed to suppress any overvoltage above its breakdown voltage to protect the one or more circuitries to which the at least one protection branch 30 is connected. That the at least two parallel connected protection branches 30 comprises at least one TVS device 12 and may comprise at least one impedance 14, is advantageous because it provides a controlled, fast and predetermined protection to the energy harvesting circuit and is laid out, e.g., assembled, such that the surge current is uniformly distributed in the one or more parallel connected protection branches 30. In addition, the device is easy to assemble, and the assembly process may be automated which reduces cost and improves repeatability of performance (controlled, fast and predetermined protection) of the device. The number of parallel branches and the value impedances 14 that may be used depends on the characteristics of the diversion circuit 10, i.e., to have sufficient parallel branch to reliably conduct the surge current and at the same time to ensure that the voltage drop across the impedance is low but sufficient enough to make the difference in TVS device characteristics connected in the parallel branches insignificant. The impedance in addition also helps in making the effect of the difference in the lead and current path inductances in the parallel branches negligible.

During normal leakage current operation, the diversion circuit 10 is configured to divert leakage current to, e.g., through, the harvesting circuit 24. The diversion circuit 10 may be configured to, at least partially, divert the leakage current to the harvesting circuit 24. Normal leakage current operation, when used herein, may be defined as normal operation of the surge arrester 28 and when the leakage current is to be measured, e.g., when the surge arrester 28 has high impedance, e.g., resistance, at normal operating voltage. This may enable full use of the energy contained within that leakage current and may enable powering of one or more monitoring devices 35, e.g., monitoring circuit such as the measurement circuit 25, and/or harvesting of the current for use at a later point in time. This may further enable the device 20 to drive, e.g., power, one or more considerable higher loads, e.g., drive monitoring devices 35 such as radio transmission circuits, advanced measurement circuits and data processing circuits, autonomously without the need for other external power sources, and thus enabling a maintenance free solution.

Other examples of monitoring devices 35 that may be powered by the diverted leakage current are environmental, position, vibration, electrical/magnetic field sensors, etc. Leakage current, when used herein, may be defined as the current flowing in the earth conductor between the surge arrester 28 and ground during normal operating voltage of the system, and is indicative of condition of the surge arrester 28.

The device 20 is configured to lead, e.g., divert, the leakage current to the circuitries, e.g., including the measurement circuit 25. The measurement circuit 25 may be located such that the leakage current may be led directly to the measurement circuit 25, as shown in FIG. 1. However, the measurement circuit 25 may also be located in other locations, which will be described more below with reference to FIGS. 2-3 and in descriptions of the later sections.

During a surge event, i.e., when an overvoltage is present across the surge arrester 28 and the resulting impedance 14 of the surge arrester 28 is low, the diversion circuit 10 is configured to bypass the connected circuitries, e.g., harvesting circuit 24, and lead, e.g., transfer, surge current via the one or more parallel connected protection branch 30 to ground. The surge event may e.g., be lightning, switching, or temporary overvoltage events. Surge current, when used herein, may be defined as the current through the surge arrester 28 resulting from a any of the abovementioned surge events.

According to some embodiments, the diversion circuit 10, comprising one or more connected TVS devices, may change its behaviour from non-conductive to conductive during the surge event and may thus bypass the harvesting circuit 24 to ground. The at least one parallel connected protection branch 30 is thereby configured to effectively protect the connected circuitries e.g., harvesting circuit 24, against overcurrent that would otherwise damage the circuit. The at least one parallel connected protection branch 30 is furthermore configured to enable energy harvesting. When used herein, energy harvesting means that energy may be collected and used directly or stored for use in a later point in time.

Accordingly, the diversion circuit 10 is connected such that it allows leakage current to be used effectively with the harvesting circuit 24, e.g., the leakage current path of the surge arrester 28 is through the harvesting circuit 24. The diversion circuit 10 needs to be able to operate both during normal leakage current operation and protect the various electronic circuitries such as the harvesting circuit 24 during surge events, e.g., fault events such as lightning, switching or temporary overvoltage events. During surge events the circuit design of the diversion circuit may enable a change of its characteristics from non-conductive to conductive and thus bypassing the surge current, e.g., fault current, to ground safely. This effectively protects the harvesting circuit against overcurrent that would otherwise damage the circuit.

According to some embodiments, the harvesting circuit 24 may be configured to use the leakage current to power one or more monitoring devices 35. The one or more monitoring devices 35 may comprise monitoring one or more of: a temperature, the leakage current, the surge current, an electric field and a geographical location, of the surge arrester 28. The harvesting circuit 24 may be connected to power the measurement circuit 25 which may comprise a surge counting circuit configured to count surges. The surge counting circuit may be configured to register, and optionally display surge count or transmit the information, e.g., wired or wirelessly, through the monitoring device 35 to a remote location. The measurement circuit 25 may comprise a leakage current measurement circuit and may also transmit surge arrester condition information with the monitoring device. According to some embodiments, the harvesting circuit 24 may comprise an electric charge storage device 29. The storage 29 may be a capacitive storage and/or a chemical storage, e.g., a battery, and the harvesting circuit 24 may store the leakage current in the capacitive storage and/or the chemical storage, to use at a later point in time. According to some embodiments, the diversion circuit 10 may be configured to use a portion of the surge current to power the one or more monitoring devices 35 and/or the measurement device 25. According to some embodiments, the diversion circuit 10 may be configured to store a portion of the surge current to use at a later point in time.

According to some embodiments the measurement circuit 25 is configured to measure the leakage current from the surge arrester 28. The measurement circuit 25 may comprise a measuring indication unit to display the leakage current. According to some embodiments the harvesting circuit 24 comprises a conversion circuit 26. The conversion circuit 26 may be configured to convert an alternating current (AC) to a direct current (DC) and supply said DC from the harvesting circuit 24. The harvesting circuit 24, the measurement device 25, especially for measurement of leakage current, and the monitoring device 35 may be operated such that it does not affect accuracy of measurement of leakage current. Such operation, e.g., decoupling, may be realized by disabling operation of harvesting with an electronically operated switch during the event of sampling leakage current for measurement. Decoupling in operation may also be obtained by operating the harvesting circuit 24, measurement circuit 25 and monitoring devices 35 individually during different phase duration, e.g., time period, of the line frequency. In some cases, it may work fine to have the harvesting circuit 24 and the measurement device 25 in series to have the leakage current flow through them i.e., the impedance of the harvesting circuit 24 and the measurement device 25 may be insignificant compared to the surge arrester 28 to affect the leakage current.

Accordingly, embodiments herein concern a device 20 that comprises the diversion circuit 10 and the harvesting circuit 24 and solves the problem of getting energy to the harvesting circuit 24 whilst protecting the same from excessive overcurrent during surge events, e.g., system fault events. The diversion circuit may be configured to at least partially divert leakage current from the surge arrester 28 through the harvesting circuit 24 and bypass the harvesting circuit 24 and lead surge current via the at least one protection branch 30 to ground during a surge event, to protect one or more circuitries including the harvesting circuit 24. The device 20 may be configured to lead almost all of the leakage current to the measurement circuit 25 and/or harvesting circuit 24.

As mentioned above, the diversion circuit 10 comprises the at least one parallel connected protection branch 30 connected between the surge arrester 28 and ground, wherein the parallel connected protection branch 30 comprises one or more TVS device 12 and may comprise one or more impedance 14 connected in series. The number of TVS devices 12 to be used may depend on the rating of each TVS device 12 and on the maximum discharge current that the TVS device 12 needs to handle. As the TVS device 12 has a certain variation in its characteristics the one or more series connected impedance 14 may enable an even current sharing between the at least one TVS device 12 during a discharge event, e.g., a surge event. If a plurality of TVS devices 12 have a sufficiently low spread of their characteristics or if only one TVS device 12 is used, then the impedances 14 may be eliminated. The number of parallel connected protection branches 30 to be used may depend on the characteristics of the TVS device 12 and the characteristics of the surge arrester 28 to which the device is to be connected, e.g., surge current, charge etc. To have more than one parallel connected protection branch 30 is advantageous as it allows for devices to be designed that can accommodate surge arrester 28 with considerably higher characteristics, e.g., surge current, charge, etc., than what a single protection branch can support.

Referring again to FIG. 1. which for illustration purposes depicts one harvesting circuit 24 but there may be more than one harvesting circuit 24 that may be configured to harvest energy, at least partially, from the leakage current flowing, e.g., diverted, from the surge arrester 28 to the harvesting circuit 24. The harvesting circuit 24, and the measurement/monitoring circuits (25, 35) may be connected in series and together in parallel to the TVS devices 12 in one of the protection branches 30 from a plurality of protection branch 30 that are connected in parallel. Alternatively, the harvesting circuit 24 may be connected in a different protection branch 30 than that of the measurement circuit 25 and/or the monitoring circuit 35. In some configurations, only the measurement circuit 25 may be used in the device 20 and the device 20 may not comprise a monitoring circuit 35.

The TVS device 12 in the protection branch 30 may provide very high impedance compared to the impedance of the measurement device 25 and thereby divert the leakage current to the measurement device 25. The harvesting circuit 24 may be used to power the measurement device 25 and monitoring device 35. The monitoring device 35 may be connected to receive information/signal from the measurement device 25 and transmit the signal to a remote location for condition monitoring.

Figure 2:
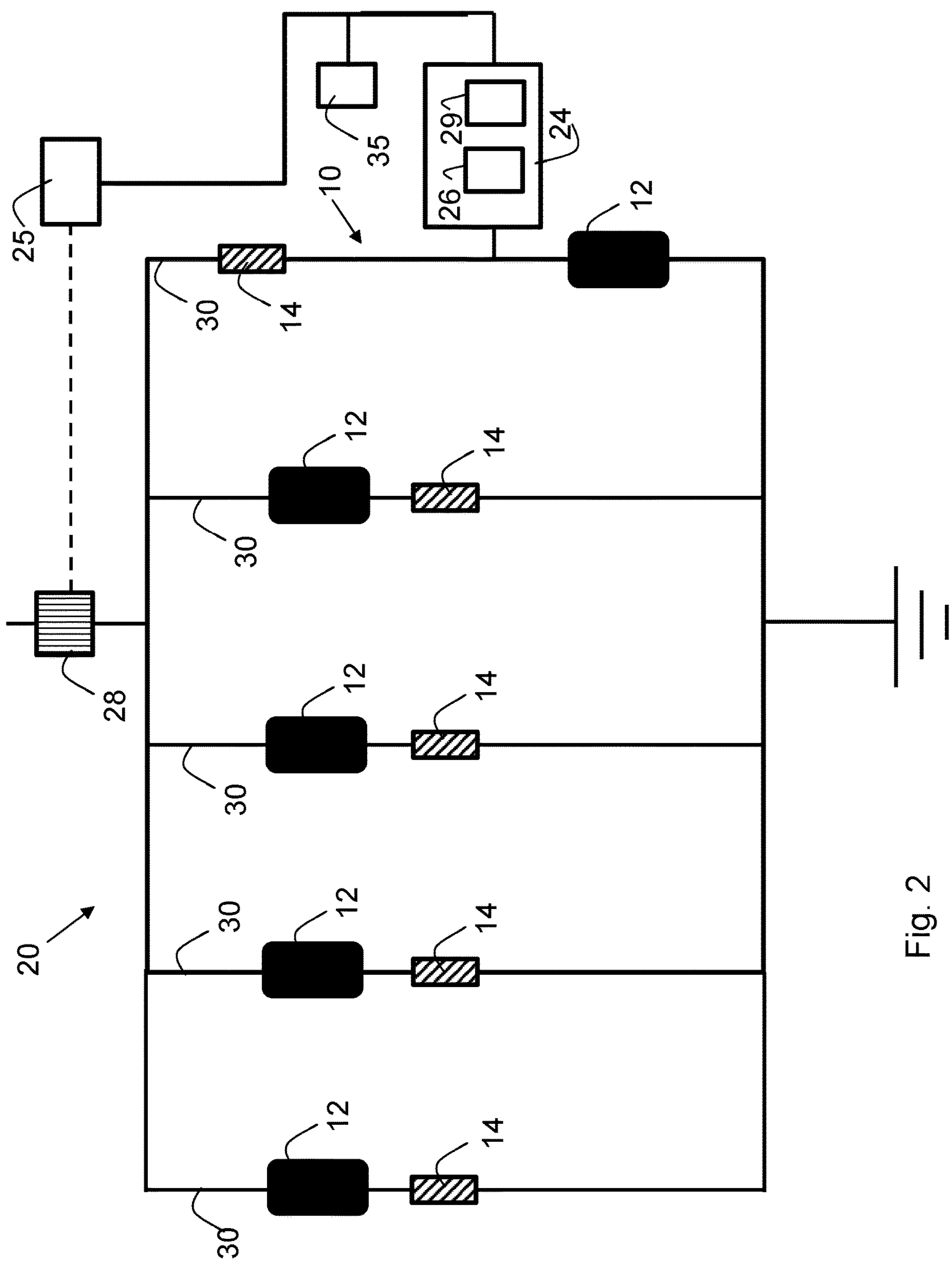
FIG. 2 shows a device according to some embodiments herein.
Figure 3:
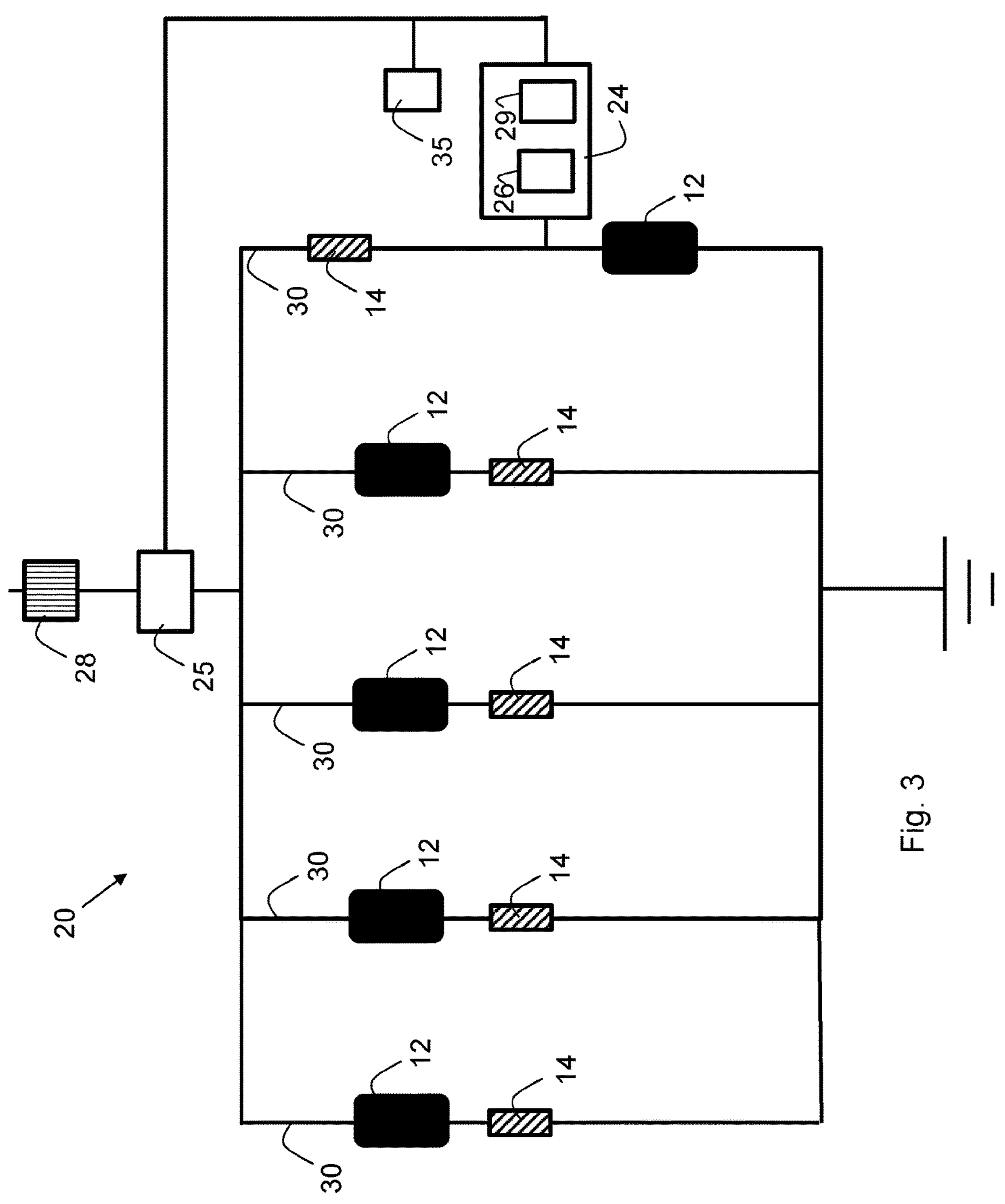
FIG. 3 shows a device according to some embodiments herein.

FIG. 2 and FIG. 3 depict the device 20 according to some embodiments having different configuration of the measurement circuit 25. The device 20 may be configured to lead the leakage current to the harvesting circuit 24 and have the TVS device 12 protect the harvesting circuit 24. The measurement circuit 25 may be configured to measure the leakage current and/or receive signal/data from the sensors to measure one or more parameters associated with the surge arrester 28.

FIG. 2 shows the location of the measurement circuit according to some embodiments. The device 20 may be configured to comprise the surge arrester 28 that provides terminals for measurement in its housing by one or more non-galvanic sensor comprised in the measurement circuit 25. The signal from such a non-galvanic sensor represents leakage current of the surge arrester 28. In the figure, the non-galvanic connection and current path is shown as a dotted line. There may be another non-galvanic sensor that provide a signal representing temperature of the surge arrester. Here, a representative signal corresponding to the leakage current flowing in the surge arrester 28 is lead directly to the monitoring circuit 35. The harvesting circuit 24 can be used to power the measurement circuit 25 and/or the monitoring circuit 35. The TVS device 12 performs the protection of the harvesting circuit 24.

The measurement circuit 25 may also be connected in parallel with the protection branch 30 and the leakage current will flow through the measurement device 25 to the ground. This location of the measurement circuit 25 is advantageous as the measurement circuit 25 can be protected by the at least one protection branch 30 and also the measurement circuit 25 is capable of measuring the leakage current providing high measurement accuracy, robustness, and low cost.

FIG. 3 shows the location of the measurement circuit 25 according to some embodiments. The measurement circuit 25 is shown to be connected between the surge arrester 28 and the at least one protection branch 30. In this configuration the measurement circuit 25 comprises a current transformer (CT) with a core or can be a Rogowski coil with the connection/line from the surge arrester 28 to the diversion circuit 10 going through the CT/Rogowski coil. The output of the CT or the Rogowski coil may provide a representative signal of the leakage current which may be further processed, e.g., filtered and amplified, at the measurement circuit 25 and/or monitoring circuit 35, and transmitted by the monitoring device 35 for telemetry and condition monitoring. In another variant of this configuration, the measurement circuit 25 may also be connected between the diversion circuit 10 and ground to measure the leakage current. In this configuration, it needs to be ensured that the harvesting circuit 25 returns the leakage current at the ground terminal of the diversion circuit 10 so that the leakage current flows through the CT/Rogowski coil to the ground of the device 20. This location of the measurement circuit 25 is advantageous because its wide range of measurement intervals, reliable design and easy implementation.

Figure 4:
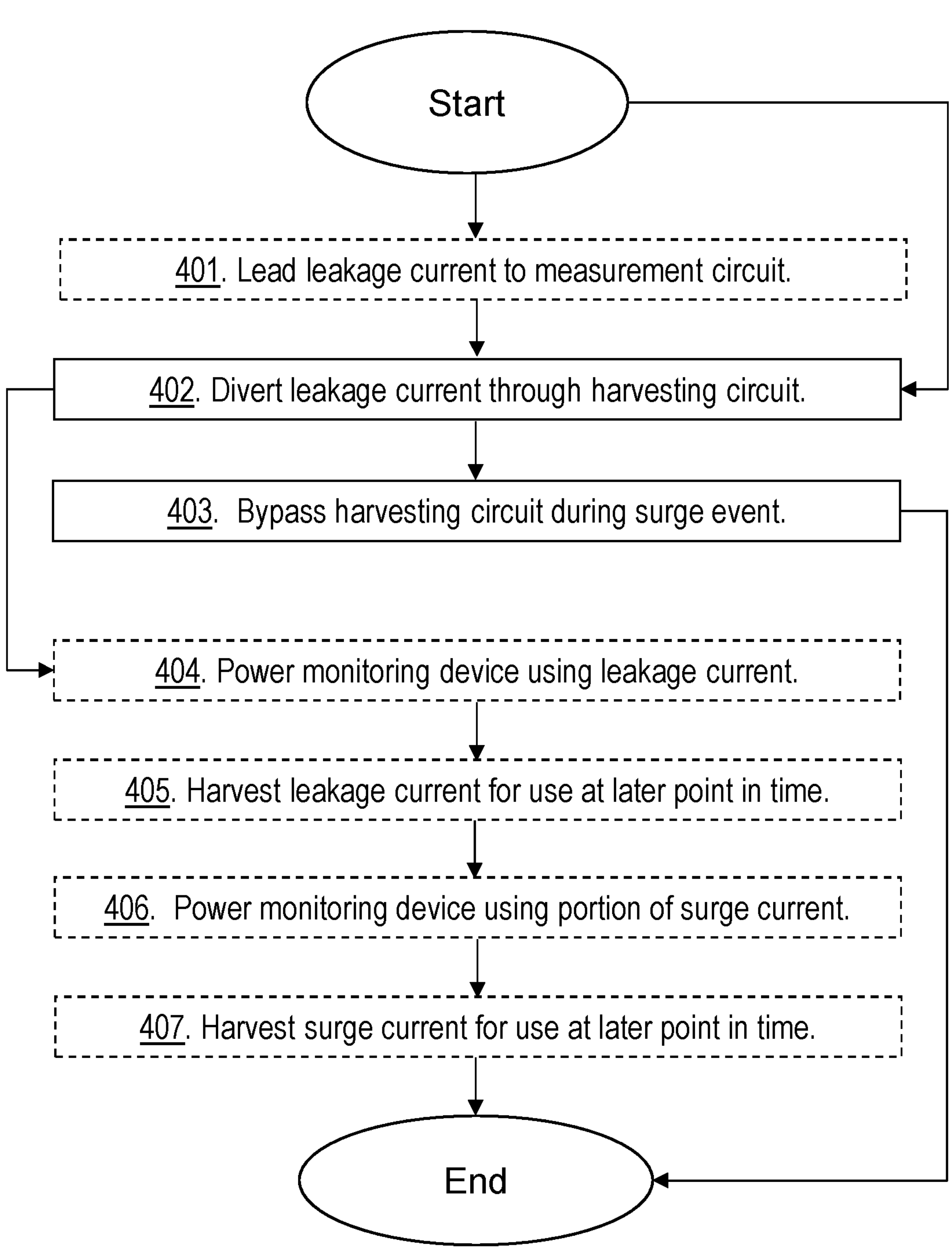
FIG. 4 is a flow chart showing a method for protecting a harvesting circuit and/or enabling energy harvesting according to embodiments herein.

The method actions for protecting the harvesting circuit 24 and/or enabling energy harvesting, according to embodiments herein, will now be described with reference to a flowchart depicted in FIG. 4. The actions do not have to be taken in the order stated below but may be taken in any suitable order. Actions performed in some embodiments are marked with dashed boxes. The method comprises the action of providing the device 20, which device comprises the diversion circuit 10 and the harvesting circuit 24. The diversion circuit 10 comprises the at least two parallel connected protection branches 30 connected between the surge arrester 28 and ground. The device may comprise the measurement circuit 25.

Action 401. To be able to measure the leakage current, the leakage current may be led to the measurement circuit 25. By measuring the leakage current, the condition of the surge arrester 28 can be monitored. The leakage current may be led to the measurement circuit in a number of ways by having different placement of the measurement circuit 25. According to some embodiments, the measurement circuit 25 may be located such that the leakage current from the surge arrester 28 can be led directly to the measurement circuit 25, as described above. According to some embodiments, the measurement circuit 25 may be connected in parallel with the harvesting circuit 24, as shown in FIG. 1. According to some embodiments, the measurement circuit 25 may be connected between the at least two protection branches 30 and ground.

Action 402.

The at least two protection branches 30 comprises at least one TVS device 12 and at least one impedance 14, e.g., a resistor, connected in series. The at least one TVS device 12 may be a TVS diode. During normal operation of the surge arrester 28, e.g., during a non-surge event, the diversion circuit 10 diverts the leakage current from the surge arrester 28 through the harvesting circuit 24.

Action 403.

During a surge event, the diversion circuit 10 bypasses the harvesting circuit 24 and leads the surge current via the at least one parallel connected protection branch 30 to ground. The at least two parallel connected protection branches 30 are configured to protect the harvesting circuit 24. According to some embodiments, the diversion circuit 10 changes its behaviour from non-conductive to conductive during the surge event.

Action 404.

The leakage current may be used to power the one or more monitoring devices 35. The one or more monitoring devices 35 may comprise monitoring one or more of: the temperature, the leakage current, the surge current, the electric field and the geographical location, of the surge arrester 28.

Action 405.

The leakage current may be harvested for use at a later point in time.

Action 406.

A portion of the surge current may be used to power the one or more monitoring devices 35.

Action 407.

The surge current may be harvested for use at a later point in time.

It is to be noted that any feature of any of the aspects may be applied to any other aspect, wherever appropriate. Likewise, any advantage of any of the aspects may apply to any of the other aspects.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

It will be appreciated that the foregoing description and the accompanying drawings represent non-limiting examples of the method and arrangement taught herein. As such, the arrangement and techniques taught herein are not limited by the foregoing description and accompanying drawings. Instead, the embodiments herein are limited only by the following claims and their legal equivalents.

The invention claimed is:

1. A device comprising a diversion circuit, a surge arrester and a harvesting circuit, wherein the diversion circuit comprises at least two parallel connected protection branches each connected between the surge arrester and ground, wherein the harvesting circuit is connected to one of the at least two parallel connected protection branches and wherein each of the at least two protection branches each comprising at least one transient voltage suppression, TVS diode and at least one impedance connected in series with the at least one TVS diode, wherein the diversion circuit is configured to:

divert leakage current from the surge arrester through the harvesting circuit; and bypass the harvesting circuit and lead surge current via one or more of the at least two protection branches to ground, during a surge event, to protect the harvesting circuit.

2. The device according to claim 1, further comprising a measurement circuit and wherein the device is configured to lead the leakage current to the measurement circuit.

3. The device according to claim 2, wherein the device is configured to lead the leakage current directly to the measurement circuit; or wherein the measurement circuit is connected with the harvesting circuit; or wherein the measurement circuit is connected between the surge arrester and the diversion circuit; or wherein the measurement circuit is connected between the diversion circuit and ground.

4. The device according to claim 2, wherein the measurement circuit is configured to measure the leakage current from the surge arrester.

5. The device according to claim 1, wherein the harvesting circuit is configured to use the leakage current to power one or more monitoring devices.

6. The device according to claim 5, wherein the one or more monitoring devices comprises monitoring one or more of: a temperature, the leakage current, the surge current, an electric field, and a geographic location, of the surge arrester.

7. The device according to claim 1, wherein the harvesting circuit comprises a storage, wherein the storage is a capacitive storage and/or a chemical storage, and wherein the harvesting circuit is configured to store the leakage current in the storage, to use at a later point in time.

8. The device according to claim 1, wherein the harvesting circuit is configured to use a portion of the surge current to power one or more monitoring devices.

9. The device according to claim 1, wherein the harvesting circuit is configured to store a portion of the surge current to use at a later point in time.

10. The device according to claim 1, wherein the harvesting circuit comprises a conversion circuit, and wherein the conversion circuit is configured to convert an alternating current, AC, to a direct current, DC, and supply said DC current to the harvesting circuit.

11. Method for protecting a harvesting circuit and/or enabling energy harvesting, wherein the method comprises the step of providing a device comprising a diversion circuit, a surge arrester and the harvesting circuit, wherein the diversion circuit comprises at least two parallel connected protection branches connected between the surge arrester and ground; wherein the harvesting circuit is connected to one of the at least two parallel connected protection branches, and wherein the at least two protection branches each comprises at least one transient voltage suppression, TVS diode and at least one impedance connected in series with the at least one TVS diode, and wherein the method comprises:

diverting leakage current from the surge arrester through the harvesting circuit; and bypassing the harvesting circuit and leading surge current via the at least two protection branches to ground, during a surge event, wherein the at least two protection branches each is configured to protect the harvesting circuit.

12. The method according to claim 11, wherein the device comprises a measurement circuit and wherein the method further comprises: leading the leakage current to the measurement circuit.

13. The method according to claim 11, further comprises:

powering one or more monitoring devices by using the leakage current;

and/or harvesting the leakage current for use at a later point in time.

14. The method according to claim 11, further comprises:

powering one or more monitoring devices by using a portion of the surge current; and/or harvesting the surge current for use at a later point in time.

* * * * *